United States Patent
Albright

(10) Patent No.: US 7,210,162 B2
(45) Date of Patent: Apr. 24, 2007

(54) DVB-ASI SIGNAL INVERTING ADAPTER AND SYSTEM

(75) Inventor: Barry Wynn Albright, Salt Lake City, UT (US)

(73) Assignee: Koninklijke Philips Electronics N.V., Eindhoven (NL)

(*) Notice: Subject to any disclaimer, the term of this patent is extended or adjusted under 35 U.S.C. 154(b) by 1107 days.

(21) Appl. No.: 09/749,832

(22) Filed: Dec. 27, 2000

(65) Prior Publication Data

US 2002/0083467 A1    Jun. 27, 2002

(51) Int. Cl.
*H04N 7/16* (2006.01)

(52) U.S. Cl. .................. 725/149; 348/180; 330/195; 725/146

(58) Field of Classification Search ........... 725/149, 725/146; 348/180, 722; 330/195
See application file for complete search history.

(56) References Cited

U.S. PATENT DOCUMENTS

| | | | | |
|---|---|---|---|---|
| 4,885,747 A | * | 12/1989 | Foglia ................. | 370/490 |
| 5,754,254 A | * | 5/1998 | Kobayashi et al. ..... | 348/578 |
| 6,356,212 B1 | * | 3/2002 | Lyons et al. ......... | 341/60 |
| 6,385,745 B1 | * | 5/2002 | Grivna ................ | 714/707 |
| 6,546,063 B1 | * | 4/2003 | Lee et al. ............ | 375/346 |
| 6,567,988 B1 | * | 5/2003 | Okawa ................ | 725/127 |
| 2002/0024970 A1 | * | 2/2002 | Amaral et al. ........ | 370/468 |
| 2002/0145661 A1 | * | 10/2002 | Takahashi et al. ..... | 348/65 |
| 2004/0133924 A1 | * | 7/2004 | Wilkins et al. ....... | 725/135 |

FOREIGN PATENT DOCUMENTS

| | | |
|---|---|---|
| EP | 964573 | 6/1998 |
| EP | 964574 | 6/1999 |
| JP | 10190767 | 12/1996 |
| JP | 11239309 | 2/1998 |
| WO | 9912353 | 9/1998 |

OTHER PUBLICATIONS

Mini-Circuits Catalog, "RF Transformers Wideband 12.5 to 1800 ohms", pp. 192-193.

* cited by examiner

*Primary Examiner*—Chris Kelley
*Assistant Examiner*—James Sheleheda
(74) *Attorney, Agent, or Firm*—Larry Lieberchuk

(57) ABSTRACT

An inverting adapter is disclosed that inverts inverted DVB-ASI signals to produce an adapted DVB-ASI signal. This adapted DVB-ASI signal may be used by any DVB-ASI device. The inverting adapter can be contained in one small package and easily connected to any of the various amplification devices that produce inverted DVB-ASI signals. Alternatively, the inverting adapter of the present invention may be integrally formed with an amplification device to automatically provide the adapted DVB-ASI signal.

24 Claims, 5 Drawing Sheets

SDV NRZI Spectrum

DVB-ASI Spectrum

DVB-ASI SIGNAL INVERTING ADAPTER AND SYSTEM

FIELD OF THE INVENTION

The present invention relates to digital video, and more particularly, to a Digital Video Broadcast (DVB) Asynchronous Serial Interface (ASI) inverting adapter and system.

BACKGROUND OF THE INVENTION

Digital video has become increasingly important. Generally, several formats may be used when generating and processing digital video signals. One such format is called Serial Digital Video (SDV) format, which is a way of serially packaging the raw digital data from a moving picture. For instance, a digital camera could be generating images of a scene of a film using an SDV data format. There are several standards associated with SDV, such as standards 259M and 125M of the Society of Motion Picture and Television Engineers (SMPTE). These standards govern, for example, what is encompassed within the data stream, the speed of the data stream, encoding of the data.

Another popular format used when transmitting digital video is the Digital Video Broadcast-Asynchronous Serial Interface (DVB-ASI). DVB-ASI is governed by the following standard: European Committee for Electrotechnical Standardization/European Telecommunications Standardization Institute (CENELEC/ETSI) EN50083-9 (1998)—DVB-A010, Interfaces for CATV, "SMATV Headends and Similar Professional Equipement, Annex B: Asynchronous Serial Interface (ASI), the disclosure of which is incorporated by reference herein. Generally, images in SDV format are compressed through, for example, Motion Picture Expert Group (MPEG) compression standard. After compression, the MPEG data stream will be encoded in accordance with the DVB-ASI standard.

An exemplary system using these data streams is shown in FIG. 1. In FIG. 1, system 100 comprises an SDV source 110, a routing switcher 120, an SDV-to-MPEG encoder 130, a distribution amplifier 140, an MPEG-to-SDV decoder 150, and several resistors. In general, system 100 would work as follows. The SDV source 110 could be a digital television camera. The SDV source generates the digital video, encodes it into an SDV format, and sends this data stream to the routing switcher 120. The encoder 130 converts this SDV data stream to an MPEG data stream, which is also routed through the routing switcher 120 or another routing switcher (not shown). The resultant DVB-ASI signal is amplified, if desired, by distribution amplifier 140, and is then sent to the decoder 150 to be converted back to SDV, for example for display or storage. Distribution amplifier 140 is not needed but may be present in some systems. Between the distribution amplifier 140 and decoder 150, there could be any type of network, such as a wired or wireless network. In particular, satellite transmission and subsequent reception commonly occur here.

The routing switcher 120 is a programmable interconnection device. As such, it allows inputs to be routed to outputs. In this example, the routing switcher 120 connects an output of the SDV source 110 with an input of the encoder 130 and the DVB-ASI output of the encoder 130 to an input of the distribution amplifier 140. It is possible to program the routing switcher 120 to connect the output of the SDV source 110 to the input of the decoder 150 (through the distribution amplifier 140). However, because the decoder 150 works with MPEG data streams, such as DVB-ASI, and not SDV data streams, this routing would be nonsensical. Generally, the system designer ensures that signals are properly routed through the switcher.

The switcher may be thought of as providing logical connections to differential amplifiers 170. The differential amplifiers 170 provide true and compliment outputs. In the example of FIG. 1, one of the differential amplifiers 170 has SDV and inverted SDV outputs, and the other differential amplifier 170 has DVB-ASI and inverted DVB-ASI outputs.

The standards for the SDV format allow both the inverted and non-inverted signals to be used. Thus, for the example of FIG. 1, the inverted SDA signal could go to another SDV-to-MPEG encoder (not shown). The standards for the DVB-ASI format, however, do not allow the inverted DVB-ASI signal to be used. Because of this, the inverted DVB-ASI signals are discarded and are connected to ground through a resistor R, or another similarly destructive device.

While system 100 of FIG. 1, performs effectively for many applications, system 100 contains a number of inefficiencies, which, if overcome, could further improve the performance of the digital video system. Specifically, because the inverted DVB-ASI signals are connected to ground through a resistor, R, there is a loss of power and increased radiated emissions. The power in the inverted DVB-ASI signal is essentially converted to heat in the resistor, R, thereby wasting power. Also, because the resistor, R, grounds the inverted DVB-ASI signal, there are non-symmetrical outputs on the differential amplifier 170. If both signals were complementary, reduced emissions would occur because both signals would effectively cancel each other. However, in the system 100 of FIG. 1, one of the signals is sent to ground, which causes higher radiated emissions. Thus, the system of FIG. 1 causes higher-than-ideal power and emissions. What is needed therefore is a system that reduces or eliminates these problems, yet is also relatively inexpensive, simple, and easy-to-implement.

SUMMARY OF THE INVENTION

The present invention provides a Digital Video Broadcast Asynchronous Serial Interface (DVB-ASI) system and device. The inverting adapter of the present invention inverts the inverted DVB-ASI signals to produce an adapted DVB-ASI signal. This adapted DVB-ASI signal may now be used by any DVB-ASI device. In one embodiment, the inverting adapter can be contained in one small package and easily connected to any of the various amplification devices that produce inverted DVB-ASI signals. Alternatively, the inverting adapter of the present invention may be integrally formed with the amplification device to automatically provide the adapted DVB-ASI signal.

The inverting adapter and a system using the same allow the use of the inverted DVB-ASI signal. Thus, power and radiated emissions are reduced. Instead of grounding the inverted DVB-ASI signal and wasting this signal, the present invention re-inverts the signal to create the adapted DVB-ASI signal. Now true and complement DVB-ASI signals will be balanced and complementary, which leads to lower radiated emissions. Additionally, the inverted DVB-ASI signal may now be used, which reduces power loss. Finally, the inverting adapter is simple, easy-to-use, and very inexpensive.

A more complete understanding of the present invention, as well as further features and advantages of the present invention, will be obtained by reference to the following detailed description and drawings.

DETAILED DESCRIPTION

Figure 1:
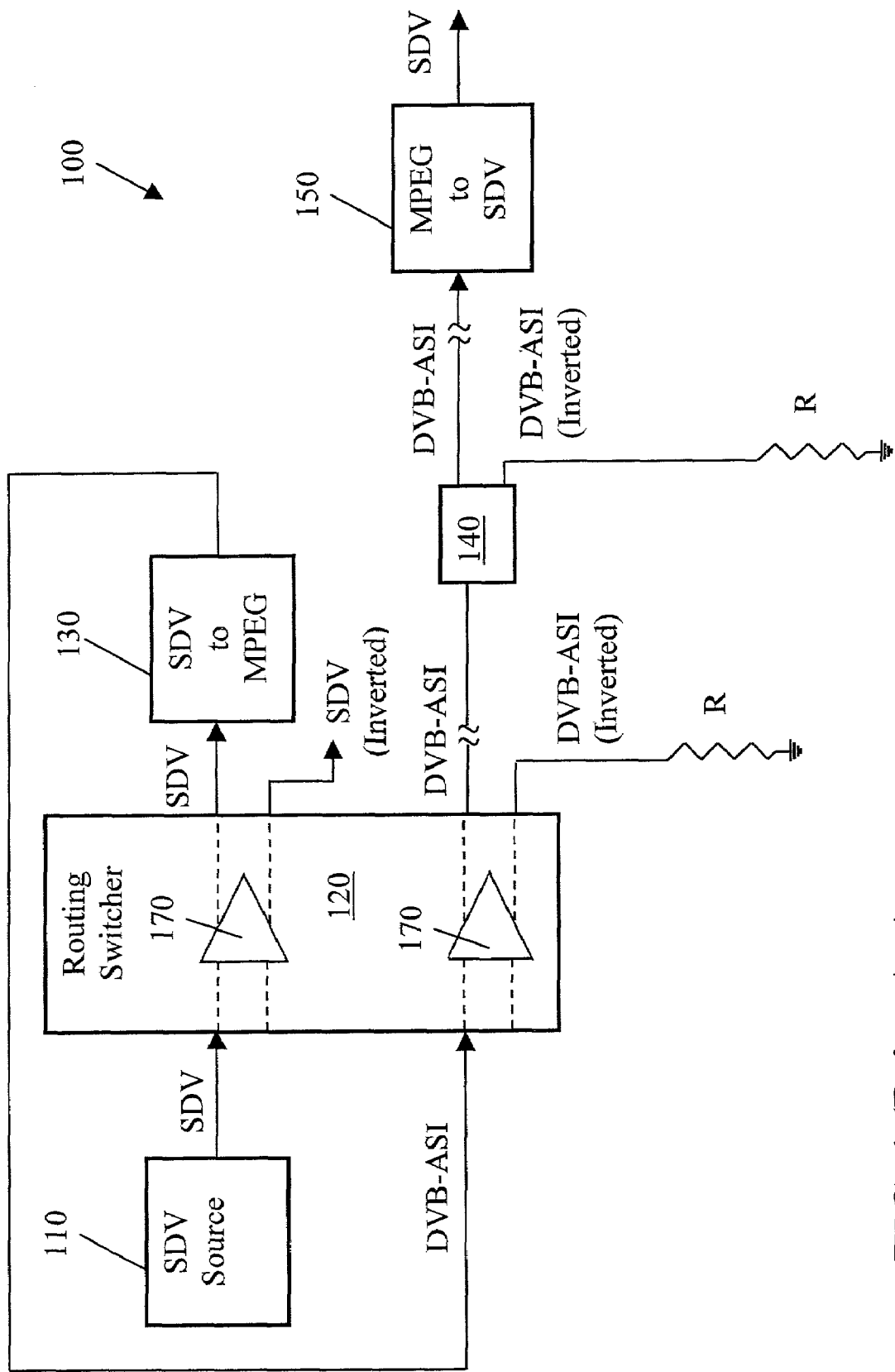
FIG. 1 illustrates a prior art digital video television system.

The present invention provides an inverting adapter and a system using the same. The inverting adapter of the present invention inverts the inverted DVB-ASI signals to produce an adapted DVB-ASI signal. This adapted DVB-ASI signal may now be used by any DVB-ASI device. The inverting adapter can be contained in one small package and easily connected to any of the various amplification devices that produce inverted DVB-ASI signals. Alternatively, the inverting adapter of the present invention may be integrally formed with the amplification device to automatically provide the adapted DVB-ASI signal.

The inverting adapter may comprise a transformer that accepts the inverted DVB-ASI signal and that outputs an adapted DVB-ASI signal. The adapted DVB-ASI signal will preferably be an inverted version of the inverted DVB-ASI signal. As is used herein, "inverted" means that each bit of the inverted DVB-ASI signal will be converted to the opposite binary value. For instance, a string of inverted DVB-ASI bits of "01110," where each 0 and 1 is a binary value, would be inverted to "10001" by the inverting adapter of the present invention. It should be noted that each binary value may be enumerated in any number of ways, such as through pulse code modulation, bipolar signaling, duobinary signaling, or Manchester signaling.

As will be discussed in more detail below, the Digital Video Broadcast-Asynchronous Serial Interface (DVB-ASI) signal and its inverted counterpart are encoded in such a way as to contain little or no information around the Direct Current (DC) frequency of zero. Thus, a version of the inverting adapter that uses a transformer, which will not couple DC, should not affect the inverted DVB-ASI signal.

The primary and secondary windings of the transformer are wound in a 1:1 ratio, which implies no amplification. Additionally, the primary and secondary side would be of opposite polarity, which makes inversion of the inverted DVB-ASI signal relatively easy.

In one embodiment of the invention, the inverting adapter is formed into a self-contained, metal adapter having input and output couplings. This can easily be placed into current digital video systems and it contains a very high amount of Radio Frequency (RF) shielding. Moreover, an inverting adapter formed in this manner will be very inexpensive and easy-to-use.

Alternatively, it is possible to add the inverting adapter directly to amplification devices such as routing switchers or distribution amplifiers. By "amplification device" it is not necessarily meant that the amplification be greater than one; the amplification can be one or even less than one. Adding the inverting adapter to these amplification devices will cost a minimal amount, but the inverting adapter will take some space inside the amplification devices and the amplification devices will require some amount of redesign.

The present invention has the following advantages. Because the inverting adapter and a system using the same allow the use of the inverted DVB-ASI signal, power and radiated emissions are reduced. Instead of grounding the inverted DVB-ASI signal and wasting this signal, the present invention re-inverts the signal to create the adapted DVB-ASI signal. Now true and complement DVB-ASI signals will be balanced and complementary, which leads to lower radiated emissions. Additionally, the inverted DVB-ASI signal may now be used, which reduces power loss. Finally, the inverting adapter is simple, easy-to-use, and very inexpensive.

Figure 2:
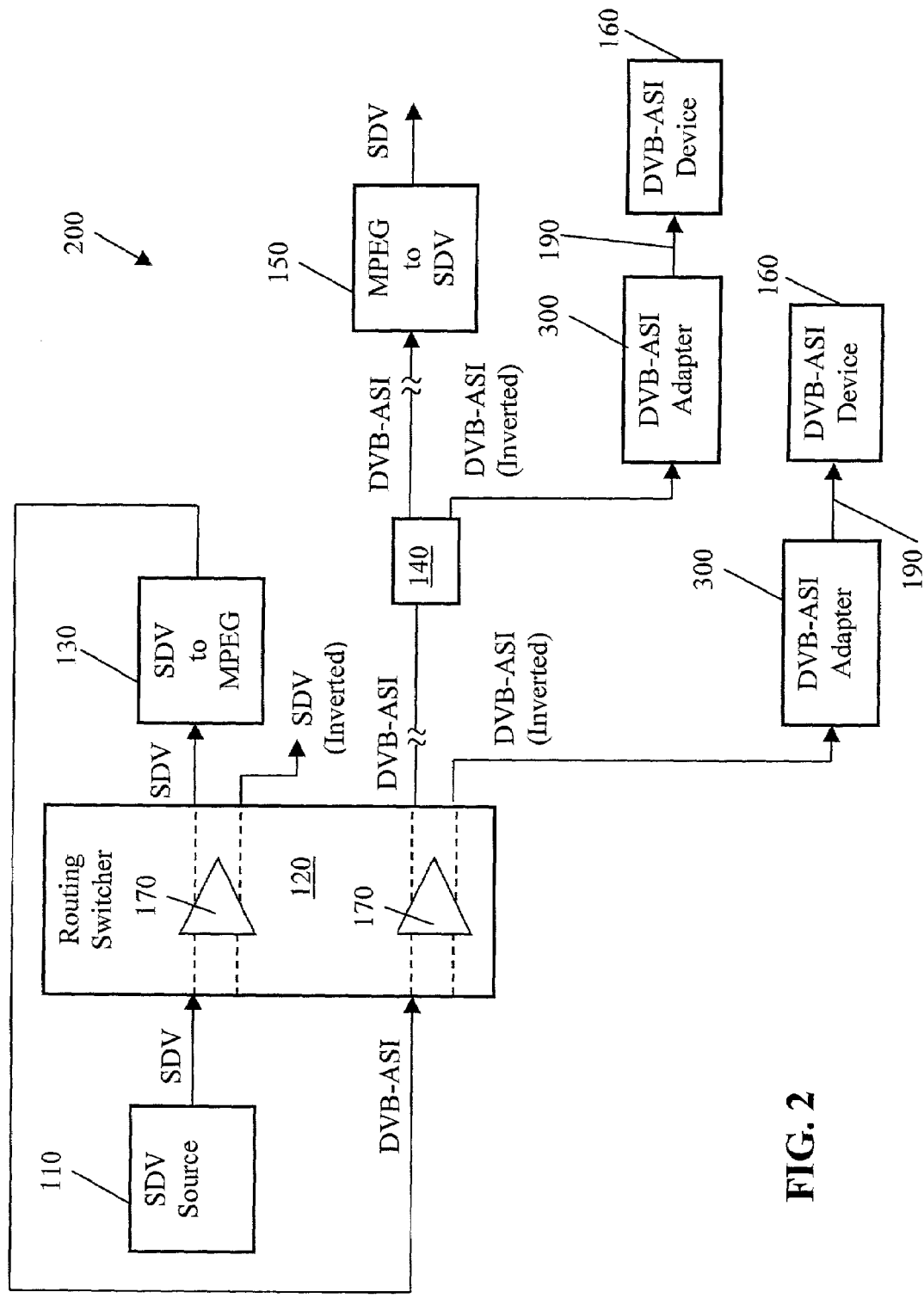
FIG. 2 illustrates a digital television system in accordance with a preferred embodiment of the present invention.

Referring now to FIG. 2, a digital video system 200 in accordance with the present invention is shown. In this and other figures, like numerals correspond to similar devices. System 200 comprises a Serial Digital Video (SDV) source 110, a routing switcher 120, an SDV-to-Motion Picture Experts Group (MPEG) encoder 130, a distribution amplifier 140, an MPEG-to-SDV decoder 150, two DVB-ASI inverting adapters 300, discussed further below in conjunction with FIGS. 3–5, and two MPEG devices 160. In the example of FIG. 2, routing switcher 120 comprises two differential amplifiers 170.

In general, system 200 would work as follows. The SDV source 110 could be, e.g., a digital television camera. This SDV source generates digital video, encodes the video into an SDV format, and sends this data stream to the routing switcher 120. The encoder 130 converts this SDV data stream to an MPEG data stream, encoded as DVB-ASI. This DVB-ASI signal is also routed through the routing switcher 120 (or perhaps another routing switcher, not shown). The resultant DVB-ASI signal is amplified, if desired, by distribution amplifier 140, and then is sent to the decoder 150 to be converted back to SDV for display or storage. Distribution amplifier 140 is not needed but may be present in some systems. Between the distribution amplifier 140 and decoder 150, or if the distribution amplifier 140 is not used, then between the DVB-ASI output of the routing switcher 120 and the input of the decoder 150, there could be any type of network, such as a wired or wireless network. In particular, satellite transmission and subsequent reception commonly occur at this point.

The routing switcher 120 is a programmable interconnection device. As such, it allows inputs to be routed to outputs. In this example, the routing switcher 120 connects an output of the SDV source 110 with an input of the encoder 130 and the DVB-ASI output of the encoder 130 to an input of the distribution amplifier 140. It is possible to program the routing switcher to connect the output of the SDV source to the input of the decoder 150 (through the distribution amplifier 140, if used). However, because the decoder 150 works with MPEG data streams, such as DVB-ASI, and not SDV data streams, this routing would be nonsensical. Generally, the system designer ensures that signals are properly routed through the switcher 120.

The switcher 120 may be thought of as providing logical connections to the differential amplifiers 170. The differential amplifiers 170 provide true and compliment outputs. In the example of FIG. 1, one of the differential amplifiers 170 has SDV and inverted SDV outputs, and the other differential amplifier 170 has DVB-ASI and inverted DVB-ASI outputs.

The standards for the SDV format allow both the inverted and non-inverted signals to be used. In other words, the signal is not polarity dependent. Thus, for the example of FIG. 1, the inverted SDA signal could go to another SDV-to-MPEG encoder (not shown).

The standards for the DVB-ASI format, however, do not allow the inverted DVB-ASI signal to be used. In other words, the DVB-ASI signal is polarity dependent. As previously indicated, in the conventional system 100 of FIG. 1, the inverted DVB-ASI signals were discarded and were connected to ground through a resistor or other similarly destructive device. In system 200 of the current invention, however, the inverted DVB-ASI signals are adapted for use. The inverting adapter 300 of the present invention is used to re-invert the inverted DVB-ASI signals. Thus, these signals may now be used and are applied to DVB-ASI devices 160. These DVB-ASI devices may be any network or other device that can use the DVB-ASI signal. In particular, these signals could be recorded through a DVB-ASI recorder. They could be converted back to the SDV format, through a DVB-ASI to SDV decoder. They could be transmitted, such as through a satellite uplink or other transmitter. They could be sent to a monitor, which allows the monitoring of the data stream. They could be distributed through a distribution amplifier or other network. Thus, a DVB-ASI device 160 can be any type of device or network suitable for DVB-ASI signals.

Routing switcher 120 and distribution amplifier 140 are types of amplification devices. An amplification device is any device that produces true and complement outputs. Generally, a differential amplifier is used as an amplification device because these produce less Electro-Magnetic Interference (EMI), they are fast and support high switching speeds, and they cancel common-mode signals. Routing switcher 120 will generally serve more of a switching function than an amplification function. The amplification will usually be in a ratio of about 1 to 1 (1:1), which is in the form input power to output power (Pi:Po). The distribution amplifier 140 will generally perform no switching function but may split signals and/or increase the power of the signal greater than a 1:1 ratio. Such ratios may be 1:10 or greater, meaning that the output is 10 times higher in power than the input.

Thus, FIG. 2 shows that, instead of wasting the inverted DVB-ASI signals, the present invention allows the inverted DVB-ASI to be reused. The inverting adapters 300 re-invert the inverted DVB-ASI signals to produce an adapted signal 190. As discussed in more detail in reference to FIG. 8, the adapted DVB-ASI signal should be exactly or very nearly equivalent to the DVB-ASI signal that is output by the differential amplifier 170 of the routing switcher 120. This provides the advantage of having the outputs of the differential amplifier 170 be balanced and symmetric. This reduces RF emissions. Moreover, the inverted DVB-ASI is no longer thrown away, which reduces power.

Figure 3:
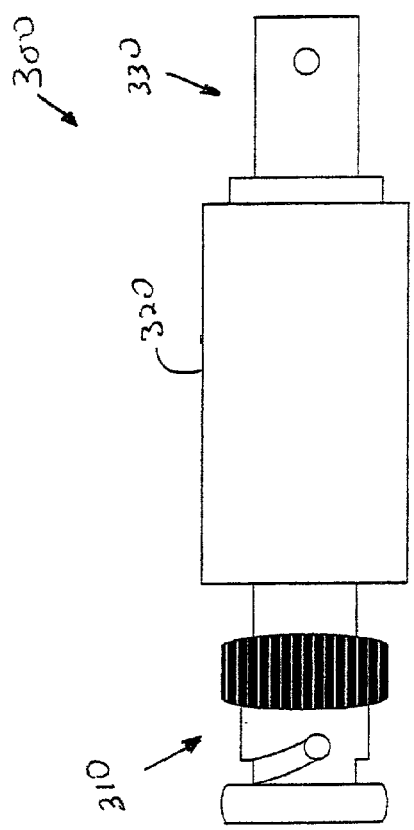
FIG. 3 illustrates a package for most preferred inverting adapter of the present invention.
Figure 4:
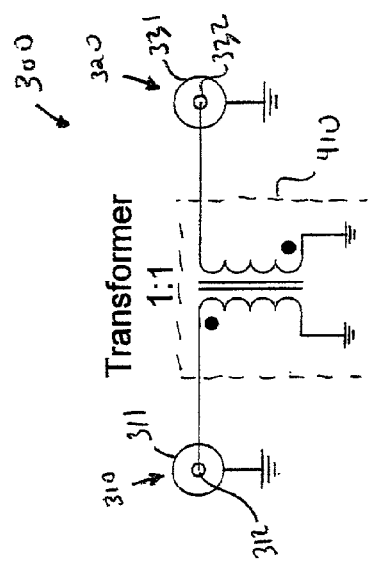
FIGS. 4 and 5, respectively, illustrate preferred wiring diagrams for the inverting adapter of the present invention.
Figure 5:
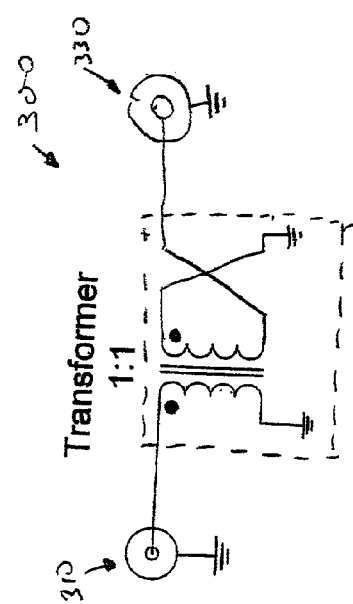

In FIG. 2, the inverting adapters 300 are preferably separate from the amplification devices (such as routing switcher 120 and distribution amplifier 140). A suitable adapter 300 for this type of system 200 is shown in FIG. 3. FIGS. 4 and 5 show suitable internal wirings of the inverting adapters 300. Referring to FIGS. 3, 4, and 5, inverting adapter 300 comprises a metallic body 320 and two couplings 310 and 330. Preferably, coupling 310 is an input coupling, which accepts the inverted DVB-ASI signal, and coupling 330 is an output coupling, which produces the adapted DVB-ASI signal. The inverting adapter 300 is simple, small, and very inexpensive. The input coupling 310 would generally connect to a coupling on the routing switcher 120 or the distribution amplifier 140. The output coupling 330 would generally connect to a cable suitable for containing DVB-ASI signals.

Couplings 310 and 330 are any type of connection suitable to connect the transformer to a routing switcher, cabling network, distribution amplifier, or other device suitable to carry or use DVB-ASI signals. As shown in FIG. 4, coupling 310 preferably comprises a shell 311 and an interconnection device 312. Coupling 330 preferably comprises a shell 331 and an interconnection device 332. Shells 311 and 331 are preferably electrically and mechanically connected to body 320. This provides solid grounding and reduces electromagnetic interference (EMI). Interconnection devices are any connection device suitable to connect a coupling to a mate. In one embodiment of the invention, as depicted in FIG. 3, the input coupling 310 is a male British Naval Connector (BNC—also known as Bayonet Nut Connector or Bayonet Neill Concelman), and the output coupling 330 is a female BNC. For these couplings, the interconnection device 332 would be a receptacle and the interconnection device 312 would be a pin.

Body 320 encloses a 1:1 transformer, as shown in FIGS. 4 and 5. As is known in the art, "1:1" refers to each of the primary and secondary sides of the transformer having an equivalent number of windings. The transformer in FIG. 4 is simple and may easily be ordered. As is known in the art, each side of a transformer has a polarity. In FIG. 4, the polarity of the secondary side is opposite to the polarity of the primary side, and vice versa. In particular, in FIG. 4, the negative connection of the primary side and the positive connection of the secondary side are grounded. The positive connection of the primary side is connected to interconnection device 312, which for a BNC coupling is a pin. The negative connection of the secondary side is connected to interconnection device 332, which for a BNC coupling is a receptacle suitable for accepting a pin.

Transformers suitable for use with the present invention should be RF transformers having a frequency range from about 10 MHz to 270 MHz. An inverting adapter 300 having such a transformer can be made by screwing or press-fitting the BNC couplings into a metallic cylinder or box. Notably, a company called Mini-Circuits (P.O. Box 350166, Brooklyn, N.Y., 11235-003) makes a transformer, model number FTB1-1-75, that is placed into a small rectangular box. This transformer has a 3 dB frequency from 0.2 to 500 MHz, two female BNC connectors for input and output, and a 1:1 primary to secondary ratio. However, it does not invert an input signal. Therefore, without modification or additional wiring or circuitry, it is not suitable for use with the present invention. However, the techniques used in making it may be used to manufacture an inverting adapter that is suitable for use with the present invention. Additionally, Mini-Circuits makes a variety of surface-mount and through-hole-mount transformers suitable for use with embodiments of the present invention.

Another wiring method is shown in FIG. 5. In this version, the positive connection of the secondary side and the negative connection of the primary side are grounded. Also, the positive connection of the primary side is connected to interconnection device 312, and the negative connection of the secondary side is connected to interconnection device 332.

Thus, FIGS. 2 through 5 show that an inverting adapter in accordance with the present invention will reject EMI, is very inexpensive, and is very simple. Moreover, a system using the inverting adapter will use less power and produce less EMI.

Figure 6:
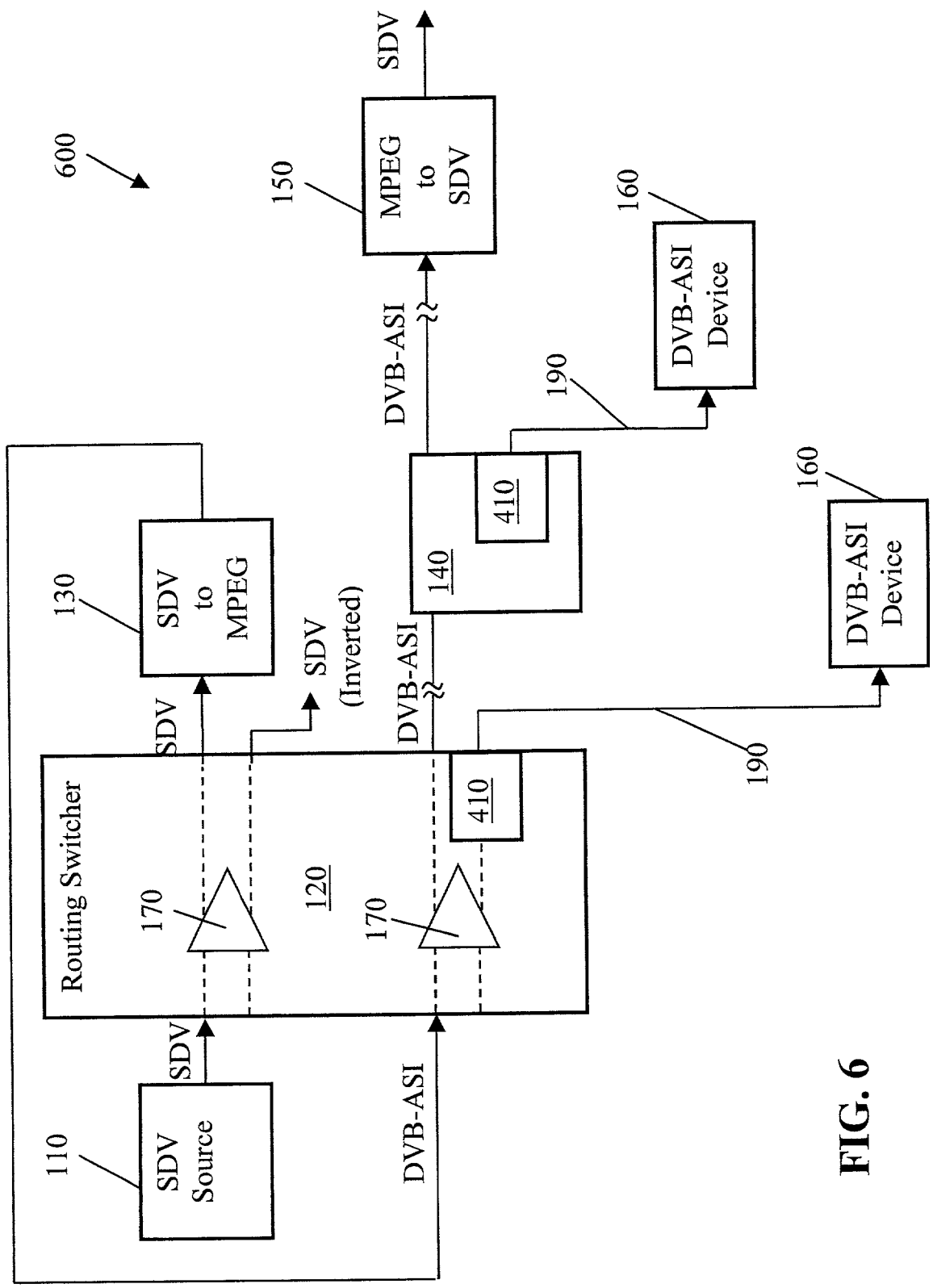
FIG. 6 illustrates a digital television system in accordance with a preferred embodiment of the present invention.

Turning now to FIG. 6, this figure shows another preferred system 600 for digital television. In the system of FIG. 2, the inverting adapter was separate from the amplification devices, which is ideal for already existing digital video systems. However, for those systems that should contain the functionality of the inverting adapter but where the designer chooses to enclose this functionality, the system of FIG. 6 may be used. Most of the devices in FIG. 6 have already been discussed in reference to FIG. 2; only the differences will be discussed herein.

In the example of FIG. 6, the inverting adapter 410 (see FIGS. 4 and 5) is added directly as part of the amplification device. In particular, the inverting adapter 410 is added to the complement output of the differential amplifier 170 in the routing switcher 120. Thus, the routing switcher 120 now produces a DVB-ASI signal and an adapted DVB-ASI signal, which should be nearly equivalent to the DVB-ASI signal. Moreover, the inverting adapter 410 has been added to the distribution amplifier 140 so that it too produces both a DVB-ASI signal and an adapted DVB-ASI signal. As shown in FIG. 6, the inverting adapter 410 (see FIGS. 4 and 5) may be "hardwired" directly into an amplification device such as routing switcher 120 or distribution amplifier 140.

Figure 7:
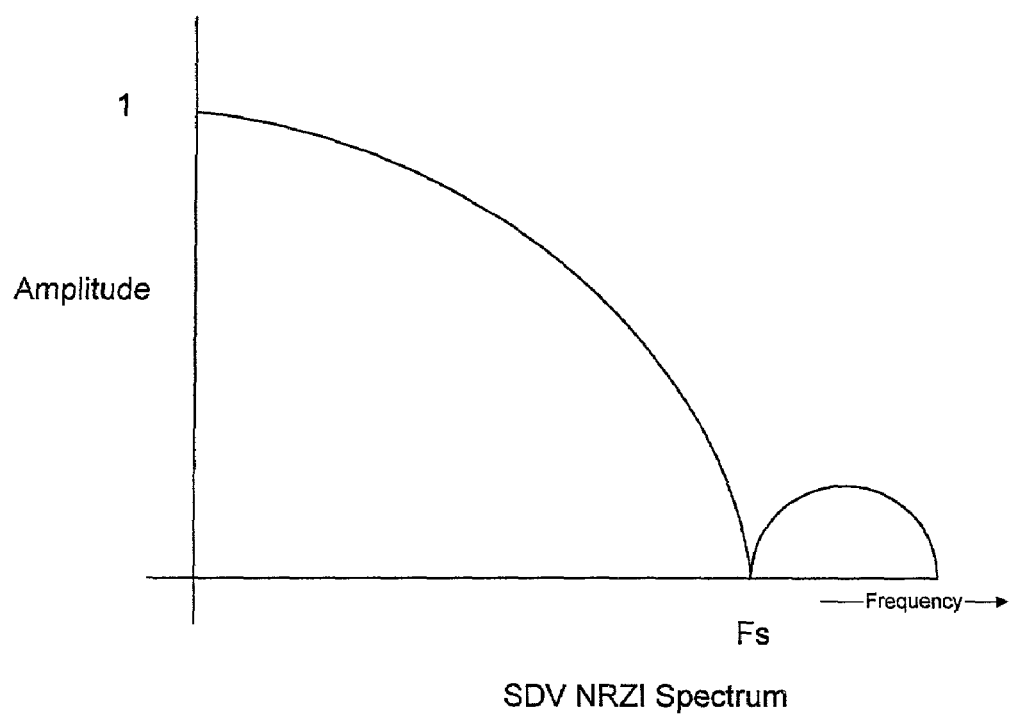
FIGS. 7 and 8 illustrate spectral diagrams of serial digital video and digital video broadcast-asynchronous serial interface signals, respectively.

Referring now to FIG. 7, a frequency spectrum is shown of a Serial Digital Video signal according to the standard 259M of the Society of Motion Picture and Television Engineers (SMPTE). The SDV signal is a Non-Return-to-Zero Inverted (NRZI) signal. As this figure shows, the SDV spectrum can contain a large amplitude at DC. This amplitude will be filtered by the inverting adapter 300 or 410 of the present invention, should the SDV signal accidentally be routed through the inverting adapter. In practice, the SMPTE 259M SDV signal may also pass through the transformer and still be considered valid. The scrambling and inversion from NRZI are intentionally done to "minimize" DC content and polarity sensitivity. However, it is recommended that SDV not be passed through an inverting adapter.

Figure 8:
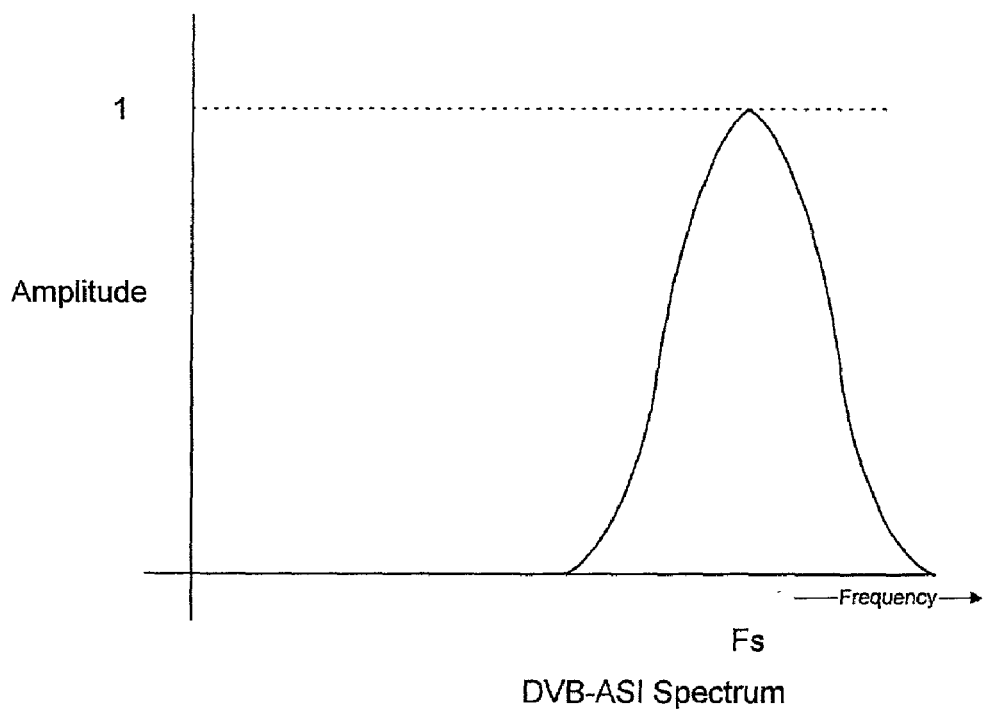

Referring now to FIG. 8, a spectrum of a Digital Video Broadcast-Asynchronous Serial Interface (DVB-ASI) signal is shown. As can be seen in FIG. 8, the DVB-ASI spectrum is centered around one particular carrier frequency and has little or no content near DC. Because of this, the inverted DVB-ASI signal (which should have the same spectrum as the DVB-ASI signal) should pass unharmed (other than being inverted) through the inverting adapter 300 or 410. As previously discussed, transformers suitable for use with the present invention should have a frequency response range typically covering 10 MHz to 270 MHz.

Thus, what has been shown is an inverting adapter that can be separate from amplification devices in a system or made integral to these devices. The inverting adapter inverts an inverted DVB-ASI signal to create an adapted DVB-ASI signal that should contain exactly the same information and polarity as a DVB-ASI signal. The inverting adapter is simple, inexpensive, and easy-to-use.

It should be noted that "adapted to" clauses in the claims are not to be construed as "means-plus-function" limitations, and that "whereby" clauses in the claims are merely to describe operation and are not to be considered limiting.

It is to be understood that the embodiments and variations shown and described herein are merely illustrative of the principles of this invention and that various modifications may be implemented by those skilled in the art without departing from the scope and spirit of the invention. For example, the windings in the transformer may be changed from a 1:1 ratio to other ratios, such as 1:1.2, 1:2 or 1:0.8.

What is claimed is:

1. An apparatus comprising:
   a routing device to generate an inverted Digital Video Broadcast-Asynchronous Serial Interface (DVB-ASI) signal; and
   an inverting adapter adapted to invert the inverted DVB-ASI signal to produce a non-inverted adapted DVB-ASI signal, wherein a non-inverted output DVB-ASI signal and the non-inverted adapted DVB-ASI signal are available simultaneously.

2. The apparatus of claim 1 wherein the inverting adapter comprises a transformer coupled to the inverted DVB-ASI signal, the transformer comprising primary and secondary sides.

3. The apparatus of claim 1 wherein the inverting adapter inverts the inverted DVB-ASI signal to produce the non-inverted adapted DVB-ASI signal, and wherein the non-inverted adapted DVB-ASI signal is coupled to a DVB-ASI device selected from the group consisting essentially of a recorder, a monitor, a decoder, a network, a transmitter, and a distribution amplifier.

4. The apparatus of claim 2 wherein each of the primary and secondary sides has a polarity, wherein the polarity of the secondary side is opposite to the polarity of the primary side, and wherein the inverting adapter inverts the inverted DVB-ASI signal to produce the non-inverted adapted DVB-ASI signal.

5. The apparatus of claim 4 wherein each of the primary and secondary sides comprises an equivalent number of windings.

6. The apparatus of claim 5 wherein the inverting adapter further comprises a body and input and output connectors, wherein the inverting adapter is enclosed in the body, and wherein the body is electrically and mechanically coupled to the input and output couplings.

7. The apparatus of claim 1 wherein the routing device outputs the output DVB-ASI signal and the inverted DVB-ASI signal.

8. The apparatus of claim 7 further comprising a Serial Digital Video (SDV) source that produces an SDV signal, wherein the SDV signal is coupled to the routing device, wherein the routing device produces an output SDV signal and an inverted SDV signal.

9. The apparatus of claim 8 further comprising an encoder that couples to the output SDV signal and that produces the input DVB-ASI signal.

10. The apparatus of claim 7, wherein the routing device comprises a differential amplifier having an input coupled to the input DVB-ASI signal and having true and complement outputs, wherein the true output is the output DVB-ASI signal and the complement output is the inverted DVB-ASI signal.

11. The apparatus of claim 10, wherein the routing device comprises the inverting adapter.

12. The apparatus of claim 1 further comprising a distribution amplifier, the distribution amplifier coupled to an input DVB-ASI signal and producing an output DVB-ASI signal and the inverted DVB-ASI signal.

13. The apparatus of claim 12, wherein the distribution amplifier comprises the inverting adapter.

14. A system comprising:
   a Digital Video Broadcast-Asynchronous Serial Interface (DVB-ASI) encoder producing a DVB-ASI output signal;
   an amplification device comprising true and complement outputs and an input coupled to the DVB-ASI signal, the true output comprising the DVB-ASI signal and the complement output comprising an inverted DVB-ASI signal; and an inverting adapter comprising a transformer comprising primary and secondary sides, wherein the primary side is coupled to the inverted DVB-ASI signal, wherein a polarity of the secondary side is opposite to a polarity of the primary side, and wherein each of the primary and secondary sides comprises an equivalent number of windings, whereby the inverting adapter inverts the inverted DVB-ASI signal to create a non-inverted adapted DVB-ASI signal, wherein the DVB-ASI output signal and the non-inverted adapted DVB-ASI signal are available simultaneously.

15. The system of claim 14, wherein the amplification device is selected from the group consisting of a routing switcher and a distribution amplifier.

16. The system of claim 14, wherein the amplification device comprises the inverting adapter.

17. The system of claim 14 wherein the non-inverted adapted DVB-ASI signal is coupled to a DVB-ASI device selected from the group consisting essentially of a recorder, a monitor, a decoder, a network, a transmitter, and a distribution amplifier.

18. The system of claim 14 wherein the amplification device comprises a routing switcher and wherein the system further comprises a Serial Digital Video (SDV) source that produces a source SDV signal that is coupled to the routing switcher, wherein the routing switcher produces an SDV signal and an inverted SDV signal, and wherein the SDV signal is coupled to the DVB-ASI encoder.

19. An inverting adapter for inverting inverted Digital Video Broadcast-Asynchronous Serial Interface (DVB-ASI) signals, the inverting adapter comprising:

a transformer comprising primary and secondary sides, wherein each of the primary and secondary sides comprises an equivalent number of windings, wherein each of the primary and secondary sides comprise positive and negative connections, and wherein the negative connection of the primary side and the positive connection of the secondary side are grounded, whereby a polarity of the secondary side is opposite to a polarity of the primary side;

a body that encases the transformer;

an input coupling adapted to accept an inverted DVB-ASI signal and comprising an input shell and an input interconnection device, wherein the input shell is electrically and mechanically coupled to the body and is electrically coupled to ground and wherein the input interconnection electrically couples the inverted DVB-ASI signal and the positive connection of the primary side;

an output coupling comprising an output shell and an output interconnection device, wherein the output shell is electrically and mechanically coupled to the body and is electrically coupled to ground, wherein the output interconnection device is electrically coupled to the negative connection of the secondary side and provides a non-inverted adapted DVB-ASI signal; and primary and secondary outputs, wherein the primary output is electrically coupled to a non-inverted DVB-ASI signal source, wherein the secondary output is electrically coupled to the non-inverted adapted DVB-ASI signal, and wherein the non-inverted DVB-ASI signal and the non-inverted adapted DVB-ASI signal are available simultaneously.

20. The inverting adapter of claim 19 wherein the input coupling is a male British Naval Connector (BNC) and wherein the output coupling is a female BNC.

21. A digital video system that processes Digital Video Broadcast-Asynchronous Serial Interface (DVB-ASI) signals, wherein the improvement comprises:

an inverting adapter adapted to invert an inverted DVB-ASI signal to produce a non-inverted adapted DVB-ASI signal, wherein a non-inverted DVB-ASI signal and the non-inverted adapted DVB-ASI signal are available simultaneously.

22. The apparatus of claim 21 wherein the inverting adapter comprises a transformer coupled to the inverted DVB-ASI signal, the transformer comprising primary and secondary sides.

23. A method for processing Digital Video Broadcast-Asynchronous Serial Interface (DVB-ASI) signals, the method comprising the steps of:

generating a non-inverted DVB-ASI signal and an inverted DVB-ASI signal;

inverting the inverted DVB-ASI signal to create a non-inverted adapted DVB-ASI signal; and providing the non-inverted DVB-ASI signal and the non-inverted adapted DVB-ASI signal for use simultaneously.

24. The method of claim 23 further comprising the steps of:

providing a inverting adapter comprising a transformer comprising primary and secondary sides, wherein each of the primary and secondary sides comprises an equivalent number of windings, wherein each of the primary and secondary sides comprise positive and negative connections, and wherein the negative connection of the primary side and the positive connection of the secondary side are grounded, whereby a polarity of the secondary side is opposite to a polarity of the primary side; and coupling the inverted DVB-ASI signal to the positive connection of the primary side, wherein the inverting adapter performs the step of inverting the inverted DVB-ASI signal to create the non-inverted adapted DVB-ASI signal.

* * * * *